US005115063A

United States Patent [19]

[11] Patent Number: 5,115,063

[45] Date of Patent: May 19, 1992

Rasicci et al.

[54] HIGH MAGNETIC STRENGTH MAGNETS CONTAINING A FLEXIBLE ACRYLATE-2-ACRYLAMIDO-2-METHYL-PROPANE SULFONIC ACID SALT BINDER

[75] Inventors: Vincent M. Rasicci, Uniontown; John F. Mioduszeski, Richfield, both of Ohio; Cecil R. Gurganus, Evansville, Ind.

[73] Assignee: GenCorp Inc., Fairlawn, Ohio

[21] Appl. No.: 758,230

[22] Filed: Sep. 9, 1991

Related U.S. Application Data

[63] Continuation of Ser. No. 448,421, Dec. 8, 1989, abandoned, which is a continuation of Ser. No. 303,618, Jan. 30, 1989, Pat. No. 4,911,855.

[51] Int. Cl.[5] .............................................. C08F 8/00

[52] U.S. Cl. .................................. 526/287; 525/328.5

[58] Field of Search ...................... 526/287; 525/328.5

[56] References Cited

U.S. PATENT DOCUMENTS

| | | | |
|---|---|---|---|
| 3,124,725 | 3/1964 | Leguillon . | |
| 3,282,909 | 11/1966 | Manuel et al. . | |
| 3,933,536 | 1/1976 | Doser et al. . | |
| 3,956,440 | 5/1976 | Deschamps et al. . | |
| 4,012,560 | 3/1977 | Baatz et al. | 526/287 |
| 4,190,548 | 2/1980 | Baermann . | |
| 4,200,547 | 4/1980 | Beck . | |
| 4,292,261 | 9/1981 | Kotani et al. . | |
| 4,327,346 | 4/1982 | Tada et al. | 252/62.54 |
| 4,373,056 | 2/1983 | Besecke et al. | 526/287 |
| 4,469,839 | 9/1984 | Maruhashi et al. . | |
| 4,496,303 | 1/1985 | Loubler . | |
| 4,600,521 | 6/1986 | Nakamura et al. | 252/62.54 |
| 4,727,116 | 2/1988 | Lange et al. | 525/328.2 |
| 4,746,687 | 5/1988 | Ryles et al. | 525/360 |
| 4,788,228 | 11/1988 | Ryles | 523/130 |

FOREIGN PATENT DOCUMENTS

| | | |
|---|---|---|
| 068903 | 1/1983 | European Pat. Off. . |
| 080160 | 6/1983 | European Pat. Off. . |

OTHER PUBLICATIONS

Chemical Abstracts, vol. 86, No. 26, 1977, Abstract No. 197906e, Columbus, OH, US; & JP-A-51 130 217 (Fuji Photo Film Co.) 12-11-1976.

*Primary Examiner*—Bernard Lipman

[57] ABSTRACT

An emulsion acrylate copolymer is provided which unexpectedly is an effective magnetic binder inasmuch as it can be loaded with high amounts of one or more magnetic particles such as ferrite or ferrite containing materials to provide a flexible permanent type magnetic composition of high magnetic energy. The copolymer is made from an alkyl acrylate and a salt of 2-acrylamido-2-methylpropane sulfonic acid (AMPS). A carboxylated ethoxy alkyl phenol surfactant is utilized which provides good processability and permits a blend of the magnetic particles with the emulsion acrylate copolymer to be precipitated from a latex solution by high shear mixing. Flexible high magnetic energy magnets can thus be made and utilized in various applications such as refrigerator doors, electrical motors, and the like.

12 Claims, No Drawings

HIGH MAGNETIC STRENGTH MAGNETS CONTAINING A FLEXIBLE ACRYLATE-2-ACRYLAMIDO-2-METHYLPROPANE SULFONIC ACID SALT BINDER

This application is a continuation of application Ser. No. 07/448,421, filed on Dec. 8, 1989, now abandoned by Vincent M. Rasicci, John F. Mioduszeski, and Cecil R. Gurganus, for "High Magnetic Strength Magnets Containing a Flexible Acrylate-2-Acrylamido-2-Methylpropane Sulfonic Acid Salt Binder" which in turn is a continuation of application Ser. No. 07/303,618, filed Jan. 30, 1989, now U.S. Pat. No. 4,911,855.

FIELD OF THE INVENTION

The present invention relates to providing flexible high magnetic energy permanent magnets by utilizing an alkyl acrylate-AMPS® (i.e., 2-acrylamido-2-methylpropane sulfonic acid) copolymer prepared by emulsion polymerization, a carboxylated ethyoxy alkyl phenol surfactant and a magnetic powder. Blends of the above compounds are readily precipitated under high shear mixing conditions.

BACKGROUND

Heretofore, the amount of magnetic material such as ferrite generally incorporated into a composition has been limited by the type of binder utilized. For example, U.S. Pat. No. 3,124,725 to Leguillon relates to a flexible plastic permanent magnet having a body portion and a relatively thin elastic high skin strength cover which is highly resistant to cracking so that the plastic permanent magnet as a whole is highly resistant to cracking in service.

U.S. Pat. No. 3,282,909 to Manuel et al relates to metal carbonyl polymer complexes which can be blended with conventional synthetic rubbers and heat-treated or vulcanized in the presence of a strong magnetic field thereby enhancing the magnetic properties of the resulting polymer.

U.S. Pat. No. 3,933,536 to Doser et al relates to magnets which are produced by dissolving an organic polymer in a solvent, adding a magnetic powder to the solution, and then adding the solution to a vehicle in which the polymer is insoluble.

U.S. Pat. No. 3,956,440 to Deschamps et al relates to the production of fine grained ferrite bodies utilizing a process for the production of ferrimagnetic materials obtained by coprecipitation from a stoichiometric mixture of metallic salts corresponding to the material composition by means of a base comprising an isostatic pressing step of the dried oxides followed by a short vacuum heat treatment of complete duration under 12 hours.

U.S. Patent No. 4,190,548 to Baermann relates to a plastic bonded permanent magnet having magnet particles which have a high affinity for oxygen such as ultrafine grain iron, bismuth-manganese and cobalt rare earth magnetic materials, dispersed within a substantially oxygen-free plastic.

U.S. Pat. No. 4,200,547 to Beck relates to a matrix-bonded permanent magnet comprising anisotropic magnetic particles which have an alignment exceeding 90 percent. The binder is a mixture of an amorphous hot-melt polyamide resin and a processing additive which is a cyclic nitrile derivative of a saturated fatty acid dimer.

U.S. Pat. No. 4,292,261 to Kotani et al relates to a pressure sensitive conductor and method of manufacturing the same wherein the conductor comprises an elastomer containing from 3 to 40 percent by volume of conductive magnetic particles.

U.S. Pat. No. 4,496,303 to Loubler relates to a method of fabricating a permanent magnet wherein a plastic bonded magnet is formed of a solidified mixture of a thermoplastic powder and magnetic particles capable of being permanently magnetized.

U.S. Patent No. 4,689,163 to Yamashita, et al relates to a resin-bonded magnet comprising particles of a melt-quenched ferromagnetic material and a binder having at least an alcoholic hydroxyl group and a block isocyanate with an active hydrogen-bearing compound.

SUMMARY OF THE INVENTION

According to the concepts of the present invention, flexible high energy permanent magnets are provided by blending an emulsion copolymer of acrylate-AMPS® with a magnetic particle containing one or more magnetic materials such as ferrite containing materials. Extraordinarily high levels of incorporation of the magnetic particle are achieved because the acrylate copolymer unexpectedly is a very effective binder. A carboxylated ethoxy alkyl phenol surfactant is utilized to impart stability to the copolymer. Reactor buildup is minimized and the ability to precipitate the magnetic particle polymer blend is obtained by high shear mixing. The copolymer coated magnetic particles are dried and packaged for use as a masterbatch. The masterbatches can be subsequently melted, plasticized, or otherwise formed and shaped into various magnetic products.

DETAILED DESCRIPTION OF THE INVENTION

The acrylate copolymers of the present invention are generally prepared by conventional emulsion polymerization techniques. More specifically, the process utilizes a latex containing water, a surfactant as described hereinbelow, and monomers of alkyl acrylate and AMPS®. A small amount, i.e. a premix as from about 3 to about 15 percent and preferably from about 5 to about 10 percent, of the latex is charged or added to a reaction vessel containing water and a small amount of additional surfactant. The reaction vessel is heated to a conventional polymerization initiation temperature, desirably from about 149° F. to about 158° F. and a free radical initiator is added to form a polymer seed. Generally, any conventional free radical initiator can be utilized as known to the art and to the literature. Specific examples include ammonium persulfate, potassium persulfate, sodium persulfate, hydrogen peroxide, cumene hydroperoxide, and the like. The seed formation causes an exotherm. Generally at the peak of this exotherm commencement of the remainder of the premix is proportionally fed into the reactor at such a rate to maintain a suitable temperature to achieve a desired molecular weight or Mooney viscosity value. Upon completion of polymerization, the emulsion is cooled to a reduced temperature of from about 25° to about 45° C. at which time an oxidizing agent such as a hydroperoxide, e.g., t-butyl hydroperoxide, cumene hydroperoxide, t-amyl hydroperoxide, etc., and subsequently a small amount of a reducing agent such as sodium formaldehyde sulfoxylate, sodium metabisulfite, etc., are added to the reaction vessel to react with any remaining monomers. The amount of residual monomer, if any, is generally quite small such as below 25 parts per million.

The alkyl acrylate monomer utilized in forming the flexible rubber or binder acrylate copolymer of the present invention has the formula

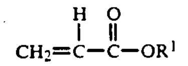

wherein $R^1$ is an alkyl having from 1 to 10 carbon atoms, desirably from 2 to 4 carbon atoms, with ethyl or butyl being preferred, as well as methacrylate derivatives thereof. The amount of the alkyl acrylate monomer is generally from about 90 percent to about 99.8 percent by weight, desirably from about 95 to about 99.7 percent, and preferably from about 97 to about 99.5 percent by weight based upon the total weight of the alkyl acrylate and the AMPS® monomers.

The AMPS® comonomer, that is a 2-acrylamido-2-methylpropane sulfonic acid salt has the formula

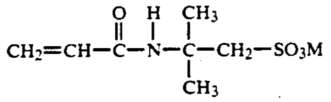

where M is an alkaline metal or $NH_4$, with sodium being preferred. The amount of the AMPS® monomer utilized is from about 0.2 to about 10 percent by weight, desirably from about 0.3 to about 5 percent by weight, and preferably from about 0.5 to about 3 percent by weight based upon the alkyl acrylate and AMPS® monomers. Amounts of the AMPS® comonomer in excess of 10 percent by weight are not desired inasmuch as a water soluble copolymer is typically formed.

Since conventional surfactants generally create foaming problems and/or render recovery of copolymer difficult, they are generally not utilized. Rather, an anionic-nonionic hybrid surfactant is utilized which is a carboxylated alkoxy alkyl phenol having the formula

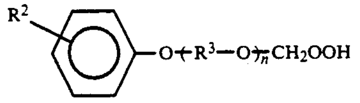

wherein $R^2$ is an alkyl having from 8 to 16 carbon atoms with 8, 9 or 12 carbon atoms being preferred, wherein $R^3$ is an alkylene having from 2 to 4 carbon atoms, desirably ethylene or propylene, with ethylene being preferred, and wherein n, often referred to as the alkylene oxide mole ratio, is from 3 to about 50 with from 3 to about 30 being preferred. This surfactant produces low-foaming, imparts reactor stability, i.e., prevention of polymer buildup on the reactor walls, and unexpectedly permits mechanical recovery of the solid copolymer coated ferrite component powder from the latex solution. The amount of the surfactant utilized is from about 1.5 to about 3.0 parts by weight and preferably from about 1.8 to about 2.5 parts by weight for every 100 parts by weight of the acrylate-AMPS® monomers. The amount of surfactant utilized tends to be important inasmuch as amounts in excess of the noted range renders copolymer recovery from the water phase difficult.

A flexible high magnetic energy composition is made by blending the emulsion latex acrylate copolymers of the present invention with one or more magnetic particles. By the term "magnetic particle," it is meant a composition having magnetic properties or a composition to which magnetic properties can be imparted. Such particles or materials are well-known to those skilled in the art as well as to the literature. Generally, according to the present invention, one of the magnetic particles is a ferrite powder. Inasmuch as the ferrite tends to be relatively inexpensive and yet an acceptable magnetic type material, it is often utilized and, hence, can exist in amounts of from about 0, 1, or 2 percent to about 90 percent by weight based upon the total weight of the magnetic materials or compounds. In addition to a ferrite per se, various other iron containing magnetic compounds or materials can also be utilized such as barium ferrite, strontium ferrite, iron oxide, and the like. Other magnetic materials or compounds include the various reaction products of metallic carbonate such as lead carbonate, barium carbonate, strontium carbonate, zinc carbonate, manganese carbonate, and the like; the various alnico magnetic compounds, the various NdFeB compounds, the various SmCo compounds, the various rare earth magnetic compounds, alloys containing various amounts of cobalt, praseodymium, dysprosium, and the like, and mixtures thereof as known to the literature and to the art. The above-noted chemical formulas are only representative inasmuch as various complexes containing different numbers of atoms therein, and the like, can be utilized as is also known to the art. Generally, any type of magnetic compound or material can be utilized according to the present invention. In order that a suitable flexible high magnetic energy magnet is obtained within the binder, the magnetic materials or compounds are desirably in the form of particles, as for example having an average particle size of 10 microns or less, desirably from 0.05 to 5.0 microns, and often about 0.8 to 1.5 microns. Small particles are generally of significance to the present invention in that the most intimate association of the polymer and the smallest magnetic particle is the objective for the present invention. In other words, the least amount of polymer and the maximum amount of magnetic particle produces the best magnetic properties. Considering the particles, they are generally of no specific shape or size but can vary. Inasmuch as they are generally small, the magnetic material can be referred to as a powder.

The blending procedure involves adding the magnetic powder to the emulsion copolymer latex and mixing whereby the copolymer generally coats the particles and also acts as a very effective binder. Typically, the copolymer encapsulates, binds, is attached to, etc. and forms a copolymer-magnetic particle. Generally from about 500 to about 1,200 parts by weight, desirably from about 800 to about 1,200 parts by weight, and preferably from about 900 to about 1,200 parts by weight of magnetic particles is mixed with the above-noted copolymer of the present invention to form a permanent magnet. Stated differently, high amounts of magnetic materials or compounds, that is generally in the form of particles are contained within the magnetic-binder composition. The amount of magnetic particle is generally at least 83 percent, desirably at least 88 percent, more desirably at least 90 percent, and preferably at least 93 percent or 95 percent by weight based upon the total weight of the magnetic particle and the acrylate copolymer.

The emulsion acrylate-AMPS ® copolymer latex of the present invention can be recovered according to a conventional salt-acid coagulation method wherein the emulsion latex is treated with conventional acid type coagulants and optional metal salts in conventional amounts to coagulate the polymerized copolymer as known to those skilled in the art as well as to the literature. Although this method can be utilized to generally coagulate the copolymer, it is not desired or preferred in the present invention since the copolymer is not always or not fully coagulated because of the types of surfactants normally utilized, the high level of AMPS ® in the copolymer, or the high ethylene oxide mole ratio, and the like.

According to the concepts of the present invention, a preferred copolymer recovery method involves initially coating the magnetic particle with the acrylate copolymer and subsequently coagulating the same under high shear mixing. The initial coating step is achieved, simply by adding the magnetic materials or particles to the acrylate latex and mixing. The copolymer tends to coat, encapsulate, cover, either partially or more desirably fully, the various individual magnetic particles. The subsequent substantial, or effective coagulation step is accomplished by mixing the magnetic powder-coated latex copolymer solution under high shear. That is, it has unexpectedly been found that the acrylate-AMPS ® copolymer coated magnetic particles can be mechanically precipitated under high shear mixing when the anionic surfactant of the present invention is utilized. In other words, high shear mixing will cause the copolymer-magnetic particle to substantially, effectively and preferably completely or totally settle or precipitate thereby forming a high solids acrylate-AMPS ® copolymer magnetic material layer and a low solids serum layer. Although the amount of AMPS ® in the acrylate-AMPS copolymer can be up to about 10 percent by weight, the amount utilized with regard to forming a magnetic binder material is only up to about 3 percent or 4 percent of weight. By "high shear," it is meant that any fluid shear rate which coagulates the copolymer-magnetic material particles. The fluid shear rate is a shear rate which is given in ft./sec.-ft. or otherwise commonly referred to as reciprocal seconds. Suitable high shear mixing, according to the present invention, is generally at least 200 reciprocal seconds. The time of mixing is generally dependent upon batch size. Any conventional high shear mixing device can be utilized as know to the art and to the literature such as a Morehouse-Cowles mixer, a Waring blender, various other impeller type mixers, and the like.

Once high shear mixing has been completed, the precipitated copolymer-magnetic particles are recovered as by filtering, and the like. The blended copolymer coated magnetic composition is then dried and may subsequently be utilized as a masterbatch. The masterbatch may contain conventional additives such as a plasticizer, lubricants, modifiers, and the like. Generally, the amount of such additives, when utilized, are small such as from about 0.25 parts to about 15 parts, since high amounts reduce the high magnetic energy of the eventual magnet. The copolymer masterbatch composition can be milled, molded, extruded, casted, calendared, etc., into a final shape.

The acrylate-AMPS ® flexible magnets of the present invention may be utilized wherever high magnetic energy or high magnetic strength magnets are desired such as for sealing refrigerator or freezer doors, motors, copier/printer developer systems, sensors, and the like.

To those knowledgeable in the art of magnetic circuit design and permanent magnet production, the invention produces the "square" knee in the second quadrant hysteresis plot that is desirable for magnets in order to have close approximation of calculated design parameters. The copolymer-magnetic powder masterbatch, after being filtered and dried, is used in additional processing that adds other additives including additional magnetic powder, to produce a magnetic compound of high magnetic strength and desirable processing advantages.

The invention will be better understood by reference to the following examples.

Latex Preparation

| | | ACTIVE PARTS PER 100 MONOMER |
|---|---|---|
| PREMIX: PROPORTION TO REACTOR @ 75-80° C. | | |
| (A) | Dist. Water | 30.0 |
| | Ammonium Hydroxide | 0.08 |
| | Carboxyl Ethoxy Alkyl Phenol | 1.80 |
| | AMPS ® | 0.50 |
| | Alkyl Acrylate | 99.5 |
| REACTOR: HEAT TO 70° C. | | |
| (B) | Dist. Water | 57.0 |
| | Carboxyl Ethoxy Alkyl Phenol | 0.10 |
| | Ammonium Hydroxide | 0.02 |
| | 5% Premix (A) | |
| INITIATOR IN @ 70° C. | | |
| (C) | Dist. Water | 2.0 |
| | Ammonium Persulate | 0.3 |
| START PROPORTIONING (A) AFTER EXOTHERM PEAKS END OF PROPORTIONING BOOSTER | | |
| (D) | Dist. Water | 1.0 |
| | Ammonium Persulate | 0.10 |
| REDOX @ 35° C. | | |
| (E) | t-butyl hydroperoxide @ 1 min. | 0.085 |
| (F) | Dist. Water | 1.0 |
| | Sodium formaldehyde sulfoxylate | 0.03 |
| POST ADDITION | | |
| Wingstay L - a hindered phenol antioxidant | | 0.25 |

The copolymer was made in the following manner: Premix (A) was mixed in a mixing vessel in the order shown and kept under mild agitation. Recipe (B) was prepared in a reaction vessel and 5 percent of Premix (A) was added thereto. The reactor was flushed with the nitrogen or evacuated and heated to approximately 70° C. The initiator (C) was then charged to the reactor. By definition, the initiation time is defined as zero hour. An exotherm occurred and once the temperature peaked, Premix (A) was fed to the reaction vessel at a rate to maintain a polymerization temperature of from about 70° to about 80° C. At the end of the proportioning addition, booster (D) was added to the reaction vessel. The reactor was then held at 80° C. by adjusting the jacket temperature until $\Delta T=0$. The reaction vessel was subsequently cooled to approximately 35° C. at which point in time the hydroperoxide, that is (E) was added. In approximately one minute thereafter, reducing agent (F) was added.

Table I sets forth the recipes of various copolymers utilizing the above latex preparation method.

TABLE I

| | EXAMPLE | | | | | | | |
|---|---|---|---|---|---|---|---|---|
| | A | B | C | D | E | F | G | H |
| Surfactant Ethylene Oxide Mole Ratio n = R = $C_9H_{19}$ | 4 | 9 | 30 | 40 | 50 | 9 | 9 | 9 |
| AMPS ® | 0.5 | 0.5 | 0.5 | 0.5 | 0.5 | 1.0 | 1.5 | 3.0 |
| Ethyl Acrylate | 99.5 | 99.5 | 99.5 | 99.5 | 99.5 | 99.0 | 98.5 | 97.0 |
| % Total Solids | 53.6 | 53.8 | 53.1 | 52.9 | 53.5 | 53.8 | 53.7 | 53.9 |
| pH | 5.7 | 5.4 | 7.3 | 4.2 | 7.0 | 6.0 | 6.0 | 5.5 |
| Surface Tension dynes/cm | 44.7 | 46.7 | 45.7 | 41.8 | 45.7 | 45.7 | 43.8 | 46.7 |
| Brook. Visc. @ 60 RPM, cps | 208 | 165 | 115 | 16 | 54 | 200 | 303 | 1360 |

The effect of the amount of AMPS ® monomer and the number of ethylene oxide repeat units of the surfactant on precipitation of the copolymer is set forth in Table II.

TABLE II (Control)
Effect of AMPS and Surfactant on Acid Coagulation of Ethyl Acrylate-AMPS Copolymer

| Example | AMPS ® (phr) | Surfactant* Ethylene Oxide Mole Ratio | Acid Coagulation Results |
|---|---|---|---|
| A | 0.5 | 4 | Large sticky crumb |
| B | 0.5 | 9 | Pea size crumb |
| C | 0.5 | 30 | Would not coagulate |
| D | 0.5 | 40 | Would not coagulate |
| E | 0.5 | 50 | Would not coagulate |
| F | 1.0 | 9 | Pea size crumb |
| G | 1.5 | 9 | Would not coagulate |
| H | 3.0 | 9 | Would not coagulate |

*Carboxylated ethoxy nonylphenol
Process Conditions
Coagulation Solution - 10% NaCl and 1% $H_2SO_4$ @ 125° F.
Drying Temperature - 150° F.

As apparent from Table II, which represents a control utilizing an acid coagulation recovery method, when the number of ethylene oxide repeat units of the surfactant was increased to high levels, that is Examples C, D and E, the latex would not coagulate when the amount of AMPS ® comonomer was 0.5 percent. When the amount of AMPS ® was increased, the copolymer still would not coagulate, that is Examples G and H. As further apparent from Table II, it is apparent that wide ranges of AMPS ® or the surfactant could not be utilized when an acid coagulation method is employed. Rather, much improved results were obtained when a shear precipitation step of the present invention was utilized.

The effect of the amount of AMPS ® and surfactant on the shear precipitation of a copolymer-ferrite masterbatch is set forth in Table III.

TABLE III

Effect of AMPS and Surfactant on Shear Precipitation of Acrylate/Ferrite Masterbatch[1]

| EXAMPLE | AMPS ® (phr) | Surfactant[2] Ethylene Oxide Mole Ratio | Mixture TSC % | Mixer[3] Type | Shear Precipitation Results: Water Release | Serum TSC % | Serum Appearance |
|---|---|---|---|---|---|---|---|
| A | 0.5 | 4 | 45 | 1 | Good | 2.9 | Large Crumbs Milky |
| B | 0.5 | 9 | 45 | 1 | Good | 0.4 | Slightly Milky |
| C | 0.5 | 30 | 45 | 1 | Poor | 0.2 | Hazy |
| D | 0.5 | 40 | 45 | 1 | Very Poor | 0.2 | Very Clear |
| E | 0.5 | 50 | 45 | 1 | Very Poor | 0.2 | Very Clear |
| F | 1.0 | 9 | 50 | 1 | Good | 0.3 | Slightly Hazy |
| G | 1.5 | 9 | 45 | 1 | Very Poor | 0.3 | Hazy |
| H | 3.0 | 9 | 45 | 1 | Very Poor[4] | 0.7 | Hazy |
| I | 0.5 | 9 | 40 | 1 | Good | 1.2 | Slightly Milky |
| (Pilot Scale) J | 0.5 | 50 | 45 | 2 | Very Poor | — | Very Clear |

[1]800/100 ferrite/polymer dry basis
[2]Carboxylated ethoxy nonyl phenol
[3]Mixer 1 - Lab Blender; Mixer 2 - 10 HP Cowles mixer
[4]Could not filter water out. Some free ferrite floating on surface As apparent from Table III, generally clear serum were obtained when shear precipitation was utilized according to the present invention indicating effective coagulation even at high mole ratios and high amounts of AMPS ® in the copolymer. Although water release in some of the Examples was poor, this is another important factor inasmuch as the coagulated particles can still be dried by various conventional means. A comparison of magnetic properties of the following amides were made:

a. Commercial polymer
b. Control acrylate/methacrylic acid (MAA) using sodium lauryl sulfate
c. Acrylate/AMPS ® using sodium lauryl sulfate (SLS)
d. Acrylate/AMPS ® using surfactant of the present invention (S)

The polymer-magnetic material was milled on a 2-roll mill and granulated several times and sifted through a 60 mesh screen. The granules were then prepared in two ways:

1. Pressed in plug mold—no heat and no flow
2. Pressed on hot press—standard method The results are set forth in Table IV.

TABLE IV

| | | Remanent Induction BR Gauss | Coercive Force H Oersteds | Intrinsic Coercive $HC_i$ | Energy Product BH Max. Mega Gauss-Oersteds | Density gm/cc |
|---|---|---|---|---|---|---|
| Magnetic Properties (89% Loading BG-12 Ferrite*) | | | | | | |
| 1. | Pneumatic plug mold permeameter data. | | | | | |
| A. | Commercial Acrylate | 2020 | 1880 | 3760 | 0.99 | |
| B. | Control | 1800 | 1780 | 3820 | 0.80 | |
| C. | Acrylate/AMPS ® Copolymer (SLS) | 1810 | 1760 | 3880 | 0.81 | |
| D. | Acrylate/AMPS ® Copolymer (S) | 2120 | 1940 | 3170 | 1.10 | |
| 2. | Sample AM-1 was selected for comparison with commercial polymer using the "hot press" method. Resulting disks were then laminated in the plug mold simulating 3-M "laminated" process. Hot press + plug mold permeameter data: | | | | | |
| A. | Commercial Acrylate | 2540 | 2430 | 4010 | 1.62 | 3.74 |
| D. | Acrylate/AMPS Copolymer | 2690 | 2240 | 3020 | 1.80 | 3.77 |

*Manufactured by Stackpole Corporation, St. Murry, Pennsylvania

As apparent from Table IV, significant improvements were obtained utilizing the surfactant and copolymer system of the present invention in comparison with a conventional acrylate homopolymer or a copolymer of the present invention utilizing a conventional surfactant.

While in accordance with the Patent Statutes, the best mode and preferred embodiment has been set forth, the scope of the invention is not limited thereto, but rather by the scope of the attached claims.

What is claimed is:

1. A copolymer, consisting essentially of (1) a monomer having the formula

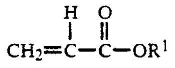

wherein $R^1$ is an alkyl having from 2 to 4 carbon atoms or a corresponding methacrylate, and (2) a comonomer having the formula

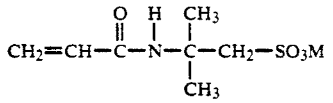

wherein M is an alkaline metal of $NH_4$, the amount of said acrylate monomer being from about 90 percent to about 99.8 percent by weight and the amount of said comonomer being from about 0.2 percent to about 10 percent by weight, said percentages based upon the total weight of said acrylate monomer and said comonomer.

2. A copolymer according to claim 1, wherein the amount of said acrylate monomer is from about 95 percent to about 99.7 percent by weight and wherein the amount of said comonomer is from about 0.3 percent to about 5.0 percent by weight, and wherein $R^1$ is an alkyl having from 2 to 4 carbon atoms.

3. A copolymer according to claim 2, wherein M is sodium.

4. A copolymer according to claim 3, wherein $R^1$ is ethyl or butyl, wherein the amount of said acrylate monomer is from about 97 percent to about 99.5 percent by weight, and wherein the amount of said comonomer is from about 0.5 to about 3 percent by weight.

5. A copolymer according to claim 1, wherein said copolymer is prepared by emulsion polymerization in the presence of an effective amount of a surfactant having the formula

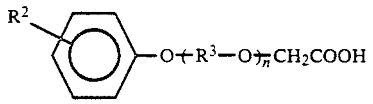

wherein $R^2$ is an alkyl having from 8 to 16 carbon atoms, $R^3$ is an alkyl having from 2 to 4 carbon atoms, wherein n is from 3 to 50.

6. A copolymer according to claim 2, wherein said copolymer is prepared by emulsion polymerization in the presence of a surfactant having the formula wherein $R^2$ is an alkyl containing 8 to 16 carbon atoms, $R^3$ is an alkyl having from 2 to 4 carbon atoms, wherein n is from 3 to 50, and wherein the amount of said surfactant is from about 1.5 to about 3.0 parts by weight per 100 parts by weight of said acrylate and AMPS monomer.

7. A copolymer according to claim 3, wherein said copolymer is prepared by emulsion polymerization in the presence of a surfactant having the formula wherein $R^2$ is an alkyl containing 8, 9, or 12 carbon atoms, $R^3$ is ethylene or propylene, wherein n is from 3 to 30, and wherein the amount of said surfactant is from about 1.5 to about 3.0 parts by weight per 100 parts by weight of said acrylate and AMPS monomer.

8. A copolymer according to claim 4, wherein said copolymer is prepared by emulsion polymerization in the presence of a surfactant having the formula wherein $R^2$ is an alkyl containing 8, 9, or 12 carbon atoms, $R^3$ is ethylene, wherein n is from 3 to 30, and wherein the amount of said surfactant is from about 1.5 to about 3.0 parts by weight per 100 parts by weight of said acrylate and AMPS monomer.

9. A copolymer according to claim 1, wherein said binder copolymer is an acid coagulated copolymer.

10. A copolymer according to claim 4, wherein said binder copolymer is an acid coagulated copolymer.

11. A copolymer according to claim 5, wherein said binder copolymer is an acid coagulated copolymer.

12. A copolymer according to claim 8, wherein said binder copolymer is an acid coagulated copolymer.

* * * * *